United States Patent Office 3,268,495
Patented August 23, 1966

3,268,495
HEAT TREATMENT OF ISOBUTYLENE-ISOPRENE COPOLYMERS
Lucien Convert, Thiais, and Raymond Fabre, Vincennes, France, assignors to Rhone-Poulenc S.A., Paris, France, a corporation of France
No Drawing. Filed Oct. 17, 1962, Ser. No. 231,270
Claims priority, application France, Oct. 19, 1961, 876,450
11 Claims. (Cl. 260—85.3)

The present invention relates to the heat treatment of copolymers of isobutylene and isoprene in the presence of promotors of the general formula.

According to the invention copolymers of isobutylene and isoprene are heated with promotors of the general formula:

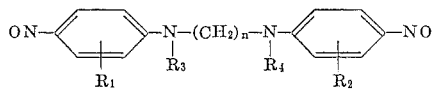
(I)

in which $R_1$ and $R_2$ each represents a hydrogen atom, a lower alkyl radical such as, for example, methyl, ethyl or propyl, or a cycloalkyl radical such as cyclopentyl or cyclohexyl, $R_3$ and $R_4$ each represents a hydrogen atom or an alkyl radical having 1 to 8 carbon atoms or form together a chain —$(CH_2)_m$—, and $n$ and $m$ are each 2 or 3.

It is known that the heating of crude elastomers, generally in association with mechanical working, produces an improvement in the properties both of these products and of the vulcanizates obtained from them, but it is above all in the case of elastomers obtained by copolymerisation of isobutylene with a diolefine that this treatment has acquired importance by reason of the particularly valuable improvement which it imparts to their properties.

This heat treatment is carried out by bringing the elastomers alone, or mixtures of the elastomers with fillers to temperatures generally between 150° and 250° C. with or without mechanical working, or with alternate periods of static heating and mechanical working, for example on a roll-type mixer.

Generally speaking, the operation is carried out in a preheated internal mixer in which the mechanical working is sufficiently intense for the temperature required for the treatment to be readily reached.

Although in some special cases the heat treatment may be carried out without the assistance of special ingredients, it is nevertheless generally more advantageous to perform such a treatment in the presence of particular chemical products called "heat-treatment promotors." In the case of mixtures comprising carbon black fillers of the "furnace" type or white fillers such as reinforcing silicas and kaolins, the advantage arising from the use of such agents is especially marked.

In the presence of promotors, the heat treatments are more rapid; that is to say, in order to obtain a particular modification of the properties of the elastomer, the heating and, where necessary, mechanical working times are shorter than in the absence of a promotor. The use of promotors furthermore makes it possible to increase the extent of the modifications undergone by the elastomer and to carry out the treatment at lower temperatures than in their absence.

The crude products obtained after the heat treatment have improved characteristics. They can be more readily worked, notably in extruding and moulding operations; the extruded articles retain the shape and the dimensions of the die and their surface has a particularly smooth appearance.

The properties of the vulcanizates are also improved as a result of the heat treatment undergone by the crude mixtures. Inter alia there are observed an increase in the moduli, an increase in resilience and a corresponding reduction of hysteresis, an increase in the resistance to abrasive wear and an increase in the electrical resistivity.

There have hitherto been employed as promotors products such as sulphur, thiazoles, thiurams, quinoidine derivatives (p-quinone dioxime or its dibenzoate) and dinitroso derivatives of the poly-p-dinitrosobenzene type and of the N-nitroso-p-nitroso-N-methylaniline type.

It is known that some of these products can be used under other conditions to exert an activating action on the vulcanization. This is what happens, for example, when, instead of being incorporated in a mixture before the heat treatment operation, they are introduced only after this treatment, simultaneously with the ingredients intended for the vulcanization. In such cases, there also results an improvement in certain properties of the vulcanizates which is greater than in the absence of activator, but the advantage is less marked than when the same auxiliary product is employed in the heat-treatment stage.

Finally, it is known that the aforesaid nitroso derivatives hitherto employed as promotors are unstable products which are likely to decompose more or less suddenly and which, consequently, can be employed only in dilute form in inert fillers such as, for example, silica and kaolin.

It has now been found that the products of Formula I may be advantageously employed as promotors in the heat treatment of elastomers obtained by copolymerisation of isobutylene and isoprene. The products constituting this new class of promotor are distinguished from the nitroso derivatives previously employed as promotors by the fact that each benzene nucleus comprises only one nitroso group, and by the absence of nitroso groups on the amino groups. These products have proved to be very effective promotors, and also are much more stable than the previously mentioned nitroso derivatives employed in the hot treatments of elastomers of the "butyl" type and have the advantage of being more convenient and safer to handle.

Among the most useful compounds of Formula I, there may be mentioned those in which $R_1$ and $R_2$ are identical and represent either a hydrogen atom or the methyl radical, while the group

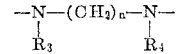

is limited to

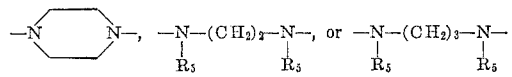

$R_5$ representing a hydrogen atom or a methyl, ethyl or cyclohexyl radical.

More particularly still, there may be specifically mentioned the following products:
1,4-bis-(4-nitrosophenyl)piperazine, M.P. about 170° C. with decomposition.

1,4-bis-(4-nitroso-m-tolyl)piperazine, M.P. about 225°–230° C. (dec.).

N,N'-bis-(4-nitrosophenyl)ethylenediamine, M.P. about 230°–235° C. (dec.).

N,N'-bis-(4-nitrosophenyl)-N,N'-dimethylethylenediamine, M.P. about 225–227° C. (dec.).

N,N'-bis-(4-nitrosophenyl)-N,N'-diethylethylenediamine, M.P. about 160–162° C. (dec.).

N,N'-bis-(4-nitrosophenyl)-N,N'-dicyclohexylethylenediamine, M.P. about 158–160° C. (dec.).

N,N'-bis-(4-nitroso-o-tolyl)ethylenediamine, M.P. about 300° C.

N,N'-bis-(4-nitroso-m-tolyl)-N,N'-diethylethylenediamine, M.P. about 140–152° C. (dec.).

N,N'-bis-(4-nitrosophenyl)-N,N'-diethyltrimethylenediamine, M.P. about 144° C. (dec.).

1,4-bis-(4-nitrosophenyl)piperazine and 1,4-bis-(4-nitroso-m-tolyl)piperazine are distinguished in addition by exerting a high activating action on the usual vulcanizing agents, such as associations of thiuram disulphides with mercaptobenzothiazole or with benzothiazyl disulphide.

The use of the compounds of Formula I is not limited to any particular isobutylene-isoprene elastomer. They may be employed with substantially all copolymers of isobutylene and isoprene commonly included in the "butyl rubber" class, that is to say, copolymers in which the proportion of combined isoprene generally does not exceed 10%.

The promotors of Formula I may be used in a proportion of 0.02% to 5% preferably 0.1% to 1.5%, calculated on the weight of copolymer. They are added either to the copolymer alone or to mixtures of the copolymer with fillers and/or the ingredients conventionally employed in the elastomer industry, with the exception of vulcanizing agents. The treatment is preferably carried out in an internal mixer at a temperature above 120° C., preferably between 150° and 250° C., for a period which may range from 5 to 15 minutes, more generally from 7 to 10 minutes. After this treatment, the mixture obtained is completed by the addition of the vulcanization agents (sulphur and accelerators) under the usual conditions for the incorporation of these agents, and then vulcanized.

If 1,4-bis-(4-nitrosophenyl)piperazine and the 1,4-bis-(4-nitroso-m-tolyl)piperazine are employed as vulcanization activators, they may be directly added to the copolymer in the course of the preparation of the mixture, simultaneously with the fillers and the vulcanizing agents, the temperature conditions naturally being such that there is no vulcanization at this stage. It is also possible first to prepare a mixture of copolymer and filler, which is thereafter subjected to a heat treatment without a promotor, and then to add thereto the vulcanization agents (sulphur and accelerators) and the 1,4-bis-(4-nitrosophenyl)piperazine or the 1,4-bis-(4-nitroso-m-tolyl)piperazine and to carry out the vulcanization. It is always possible to combine these two particular products as the promotor and the activator, using them partly during the heat treatment and partly during the subsequent preparation of the complete mixture.

The preparation of the products of Formula I may be carried out as indicated in the literature, for example in accordance with Morley, Ber., 12, p. 1795 or David S. Pratt, Ch. O. Young, Am. Soc., 40, p. 1428 for 1,4-bis-(4-nitrosophenyl)piperazine according to Braun, Heider, Muller, ber., 51, p. 738 or Boon, Chem. Soc., year 1947, p. 307–314, for N,N'-bis-(4-nitrosophenyl)-N,N'-dimethylethylenediamine, and according to Francis, Chem. Soc., 71, p. 428, for N,N'-bis,(4-nitrosophenyl)ethylenediamine.

The following examples show how the invention can be put into practice. They show, by comparison of the moduli, the advantage of employing a product of Formula I as a promotor, and some of them as activators.

*Example 1*

Six mixtures were prepared with the total compositions given in Table I below:

TABLE I

| Formula | Number of the mixture | | | | | |
|---|---|---|---|---|---|---|
| | 1 | 2 | 3 | 4 | 5 | 6 |
| Isobutylene-isoprene copolymer having medium unsaturation [a] | 100.0 | 100.0 | 100.0 | 100.0 | 100.0 | 100.0 |
| "Noir SRF" (carbon black) | 50.0 | 50.0 | 50.0 | 50.0 | 50.0 | 50.0 |
| Zinc oxide | 5.0 | 5.0 | 5.0 | 5.0 | 5.0 | 5.0 |
| Stearic acid | 0.5 | 0.5 | 0.5 | 0.5 | 0.5 | 0.5 |
| Benzothiazyl disulphide | 1.0 | 1.0 | 1.0 | 1.0 | 1.0 | 1.0 |
| Tetramethylthiuram disulphide | 1.0 | 1.0 | 1.0 | 1.0 | 1.0 | 1.0 |
| Sulphur | 2.0 | 2.0 | 2.0 | 2.0 | 2.0 | 2.0 |
| 1,4-bis-(4-nitrosophenyl)piperazine | | 0.270 | 0.125 | 0.270 | 0.500 | 1.000 |

[a] 1.52 mole percent of isoprene, Mooney viscosity 74.

Mixtures 1 and 3 to 6 were prepared as follows:

Into an internal Banbury mixer, model B, heated to 100° C., were introduced the whole quantity of copolymer and then, after one minute, half the carbon black, all the stearic acid and (except for mixture 1) the promotor. Two minutes after this second charge, the remainder of the black and the zinc oxide were added. The temperature of the mixture rose spontaneously and reached 190–200° C. 8 minutes after the commencement of the operations. The duration of the heat treatment in the presence of the promotor in the case of mixtures 3 to 6 was 7 minutes.

The other ingredients (sulphur and accelerators) were thereafter added on a roll-type mixer, the temperature being adjusted by water circulation to 60°–70° C. in the rolls.

In the case of mixture 2, the above procedure was followed, except in regard to the promotor, which was added only on the roll-type mixer.

Tests were made with the various mixtures to determine the viscosity and the Mooney scorching time, whereafter the mixtures were vulcanized in a press at 153° C. Each of the mixtures were subjected to one vulcanization for 30 minutes and another for 60 minutes. The usual determinations of modulus, tensile strength and hardness were thereafter made on the vulcanizates.

The results of these tests, which are given in Table II, show the influence of 1,4-bis-(4-nitrosophenyl)piperazine when employed as a simple vulcanization activator (mixture 2) or as a heat-treatment promotor in various proportions (mixtures 3 to 6).

TABLE II

| Properties | Number of the mixtures | | | | | |
|---|---|---|---|---|---|---|
| | Control | Activator | Promotor | | | |
| | 1 | 2 | 3 | 4 | 5 | 6 |
| Maximum power consumed in the mixing in the Banbury mixer (kw) | 8.5 | 8.5 | 8 | 8.5 | 8.5 | 8.5 |
| Mooney viscosity at 100° C. (ML5) of the mixture leaving the Banbury mixer | 76.5 | 76.5 | 77 | 82.5 | 97 | 120 |
| Mooney scorching time at 130° C. (minutes) | 20 | 15 | 19 | 19.5 | 18 | 16 |
| Characteristics in a press at 153° C.: | | | | | | |
| 300% modulus after 30 minutes (kg./cm.$^2$) | 50 | 67 | 60 | 78 | 93 | 113 |
| 300% modulus after 60 minutes (kg./cm.$^2$) | 65 | 82 | 77 | 89 | 107 | 125 |
| Tensile strength at break after 60 minutes (kg./cm.$^2$) | 93 | 107 | 101 | 115 | 122 | 130 |
| Shore hardness after 60 minutes | 61 | 61 | 57 | 55 | 52 | 52 |

Example II

Formulations 1 and 4 of Example I were retained, as also the operating technique, but the duration of the heat treatment was varied.

The mixtures thus prepared were subjected to a measurement of the Mooney scorching time and then vulcanized.

The various characteristics obtained are given in Table III.

TABLE III

| Promotor | Formula I<br>None (Control) | Formula 4<br>1,4-bis-(4-nitrosophenyl)-piperazine | | |
|---|---|---|---|---|
| Quantity percent in relation to the elastomer | | 0.27 | | |
| Duration of the heat treatment (minutes) | 7 | 7 | 10 | 15 |
| Maximum power consumed during the working in the Banbury mixer (kw.) | 8.5 | 8.5 | 8.5 | 9 |
| Temperature of the mixture at the end of the test in the Banbury mixer (° C.) | 190±10 | 190±10 | 190±10 | 190±10 |
| Mooney viscosity at 100° C. (ML5) of the mixture leaving the Banbury mixer | 76 | 82.5 | 83 | 80 |
| Mooney scorching time at 130° C. (minutes) | 20 | 18.5 | 22 | 22.5 |
| Characteristics after vulcanization in a press at 153° C.: 300% modulus of elongation after 30 min. (kg./cm.²) | 45 | 78 | 78 | 72 |
| Properties after vulcanization for 60 minutes: Tensile strength at break (kg./cm.²) | 93 | 115 | 114 | 120 |
| 300% modulus of elongation (kg./cm.²) | 60 | 89 | 92 | 85 |
| Shore hardness | 60 | 55 | 58 | 57 |

Example III

Three mixtures (numbers 7, 8 and 9) were prepared from an isobutylene-isoprene copolymer having lower unsaturation than that of the preceding Examples (0.65 mole percent of isoprene). The other ingredients were those of Example I (proportions of mixtures Nos. 1, 2 and 4). Mixture No. 7 was prepared as mixture No. 1. Number 8 was prepared as mixture No. 2, i.e. with 1,4-bis-(4-nitrosophenyl)piperazine as vulcanization activator. Mixture No. 9 was prepared as mixture No. 4 (its use as promotor for the heat treatment).

The results obtained are given in Table IV.

TABLE IV

| Number of the mixture | 7 Control | 8 Activator | 9 Promotor |
|---|---|---|---|
| 1,4-bis-(4-nitrosophenyl)piperazine | | 0.27 | 0.27 |
| Properties: | | | |
| Maximum power consumed during the mixing in the Banbury mixer (kw.) | 8 | 8 | 8.25 |
| Mooney viscosity at 100° C. (ML5) of the mixture leaving the Banbury mixer | 80 | 80 | 82 |
| Mooney scorching time at 130° C. (minutes) | 32 | 25 | 39 |
| Characteristics after vulcanization in a press at 153° C.: | | | |
| 500% modulus after 30 mins. (kg./cm.²) | 60 | 83 | 92 |
| 500% modulus after 60 mins. (kg./cm.²) | 75 | 92 | 102 |
| Tensile strength at break after 60 mins. (kg./cm.²) | 124 | 130 | 135 |
| Shore hardness after 60 mins. | 53 | 52 | 46 |

Example IV

Three mixtures (numbers 10, 11 and 12) were prepared, using a channel carbon black ("noir EPC") instead of "noir SRF". The other ingredients were those of Example I and the proportions those of mixtures 1, 2 and 4. These mixtures were prepared respectively as mixtures 1, 2 and 4, that is to say, the 1,4-bis-(4-nitrosophenyl)piperazine was used as vulcanization activator in mixture No. 11 and as heat-treatment promotor in mixture No. 12.

The various results are given in Table V.

TABLE V

| Number of the mixture | 10 Control | 11 Activator | 12 Promotor |
|---|---|---|---|
| 1,4-bis-(4-nitrosophenyl)-piperazine | | 0.27 | 0.27 |
| Properties: | | | |
| Maximum power consumed during the working in the Banbury mixer (kw.) | 9.5 | 9.25 | 9.25 |
| Mooney viscosity at 100° C. (ML5) of the mixture leaving the Banbury mixer | 99 | 99 | 107 |
| Mooney scorching time at 130° C. (minutes) | 19 | 16 | 20.5 |
| Characteristics after vulcanization in a press at 153° C.: | | | |
| 300% modulus after 30 minutes (kg./cm.²) | 56 | 63 | 67 |
| 300% modulus after 60 minutes (kg./cm.²) | 70 | 75 | 82 |
| Tensile strength at break after 60 minutes (kg./cm.²) | 178 | 182 | 175 |
| Shore hardness after 60 minutes | 60 | 60 | 56 |

Example V

The mixtures of Table VI were prepared under the same operating conditions as in Example I.

TABLE VI

| Formula | 13 Control | 14 Activator | 15 Promotor |
|---|---|---|---|
| Isobutylene-isoprene copolymer having medium unsaturation | 100 | 100 | 100 |
| Ultra-fine silica (Brand Hi-Sil 233) | 50 | 50 | 50 |
| Zinc oxide | 5 | 5 | 5 |
| Stearic acid | 2 | 2 | 2 |
| Diethylene glycol | 3 | 3 | 3 |
| Benzothiazyl disulphide | 1 | 1 | 1 |
| Tetramethylthiuram disulphide | 1 | 1 | 1 |
| Sulphur | 2 | 2 | 2 |
| 1,4-bis-(4-nitrosophenyl)piperazine | | 0.27 | 0.27 |

In the case of Mixture No. 15, the nitroso derivative was added to the Banbury mixer and in the case of Mixture No. 14 it was added only to the roll-type mixer.

The mixtures thus prepared were measured to determine the consistency and the Mooney scorching time and thereafter vulcanized.

The various characteristics obtained are given in Table VII.

TABLE VII

| Properties | Number of the mixture | | |
|---|---|---|---|
| | 13 Control | 14 Activator | 15 Promotor |
| Maximum power consumed during the mixing in the Banbury mixer (kw.) | 10 | 10 | 9.5 |
| Mooney viscosity at 100° C. (ML5) of the mixture leaving the Banbury mixer | 88 | 88 | 94 |
| Mooney scorching time at 130° C. (minutes) | 15 | 12 | 13.5 |
| Characteristics after vulcanization in a press at 153° C.: | | | |
| 500% modulus after 30 minutes (kg./cm.²) | 26 | 29 | 41 |
| 500% modulus after 60 minutes (kg./cm.²) | 35 | 35 | 48 |
| Tensile strength at break after 60 minutes (kg./cm.²) | 147 | 143 | 143 |
| Shore hardness after 60 minutes | 56 | 58 | 56 |

*Example VI*

A control mixture was prepared without promotor (number 16), following the procedure indicated in Example I in the case of mixture 1; 6 mixtures were prepared with promotor (numbers 17–22), following the procedure of Example I in the case of mixture 4, but replacing the 1,4-bis-(4-nitrosophenyl)piperazine by the promotors hereinafter indicated, and one mixture (No. 23) was prepared with 1,4-bis-(4-nitroso-m-tolyl)-piperazine, by the procedure of Example I, mixture 2.

TABLE VIII

| Mixture No. | Compound according to Formula I | Quantity, part |
|---|---|---|
| 17 and 23 | 1,4-bis-(4-nitroso-m-tolyl)piperazine | 0.3 |
| 18 | N,N'-dis-(4-nitrosophenyl)-N,N'-dimethylethylenediamine | 0.27 |
| 19 | N,N'-bis-(4-nitrosophenyl)-N,N'-diethylethylenediamine | 0.3 |
| 20 | N,N'-bis-(4-nitrosophenyl)-N,N'-dicyclohexylethylenediamine | 0.4 |
| 21 | N,N'-bis-(4-nitrosophenyl)-N,N'-diethyltrimethylenediamine | 0.31 |
| 22 | N,N'-bis-(4-nitroso-m-tolyl)-N,N'-diethylethylenediamine | 0.325 |

The various characteristics obtained are given in the following table:

TABLE IX

| | Number of the mixtures | | | | | | | |
|---|---|---|---|---|---|---|---|---|
| | Control | Promotor | | | | | | Activator |
| | 16 | 17 | 18 | 19 | 20 | 21 | 22 | 23 |
| Mooney scorching time at 130° C. (minutes) | 19½ | 22 | 22¼ | 21 | 19 | 19½ | 19½ | 17½ |
| Characteristics after vulcanization at 153° C.: | | | | | | | | |
| 300% modulus after 30 minutes (kg./cm.²) | 47.5 | 59.5 | 61.5 | 74.5 | 54.5 | 61.5 | 59.5 | 59.5 |
| 300% modulus after 60 minutes (kg./cm.²) | 62 | 77 | 77 | 87 | 70 | 84 | 76 | 72 |
| Tensile strength at break after 60 minutes (kg./cm.²) | 93 | 84 | 93 | 95 | 90 | 109 | 93 | 92 |
| Shore hardness after 60 minutes | 60 | 55 | 55 | 56 | 59 | 58 | 58 | 60 |

*Example VII*

A further control mixture was prepared without a promotor (number 24), again following the procedure indicated in Example I in the case of mixture 1, and two mixtures with promotors, following the procedure of Example I, mixture 4, but using as promotors, respectively, 0.25% of N,N'-bis - (4-nitrosophenyl) - ethylenediamine (mixture No. 25) and 0.274% of N,N'-bis-(4-nitroso-o-tolyl)-ethylenediamine (mixture No. 26) instead of 1,4-bis-(4-nitrosophenyl)piperazine.

The various characteristics obtained are given in the following table:

TABLE X

| | Numbers of the mixtures | | |
|---|---|---|---|
| | Control | Promotor | |
| | 24 | 25 | 26 |
| Mooney scorching time at 130° C. (minutes) | 23 | 23½ | 25 |
| Characteristics after vulcanization at 153° C.: | | | |
| 300% modulus after 30 minutes (kg./cm.²) | 38 | 49 | 46 |
| 300% modulus after 60 minutes (kg./cm.²) | 50 | 63 | 58 |
| Tensile strength at break after 60 minutes (kg./cm.²) | 84 | 85 | 84 |
| Shore hardness after 60 minutes | 58 | 56 | 57 |

We claim:

1. Process for the heat treatment of copolymers of isobutylene with up to 10% of isoprene, which comprises heating and mechanically working the copolymer with at least one promotor of the general formula:

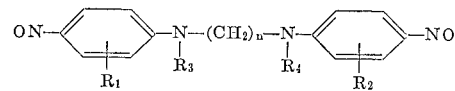

wherein each of $R_1$ and $R_2$ is selected from the group which consists of hydrogen, lower alkyl and cycloalkyl, $R_3$ and $R_4$ taken separately are selected from the group which consists of hydrogen, alkyl of 1–8 carbon atoms and cyclohexyl, and, when taken together, are selected from the group consisting of di- and tri-methylene, and $n$ is an integer above 1 and below 4, the temperature and time of the milling and the proportion of promotor being such as to substantially improve the properties of the said copolymer.

2. Process according to claim 1 wherein the amount of promotor is 0.02%–5% of the weight of the copolymer.

3. Process according to claim 1 wherein the amount of promotor is 0.1%–1.5% of the weight of the copolymer.

4. Process according to claim 3 wherein the copolymer and the promotor are heated at a temperature of 150°–250° C.

5. Process according to claim 1 wherein the copolymer and the promotor are heated at a temperature above 120° C.

6. Process according to claim 1 wherein the copolymer and promotor are mixed in the absence of vulcanization agents.

7. Process according to claim 1 wherein the copolymer is subsequently vulcanized.

8. Process according to claim 1, wherein the copolymer and the promotor are mixed together with at least one filler conventionally employed in elastomer compositions.

9. Process for the heat treatment of copolymers of isobutylene with up to 10% of isoprene, which comprises heating and mechanically working the copolymer at 150° to 250° C. with 0.1 to 1.5% by weight of 1,4-bis(4-nitrosophenyl)piperazine.

10. Process for the heat treatment of copolymers of isobutylene with up to 10% of isoprene, which comprises heating and mechanically working the copolymer at 150° to 250° C. with 0.1 to 1.5% by weight of 1,4-bis-(4-nitroso-m-tolyl)piperazine.

11. Process for the heat treatment of copolymers of isobutylene with up to 10% of isoprene, which comprises heating and mechanically working the copolymer with 0.02–5% by weight of at least one promotor of the general formula:

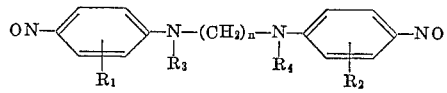

wherein each of $R_1$ and $R_2$ is selected from the group which consists of hydrogen, lower alkyl and cycloalkyl, $R_3$ and $R_4$ taken separately are selected from the group which consists of hydrogen, alkyl of 1–8 carbon atoms and cyclohexyl, and, when taken together, are selected from the group consisting of di- and tri-methylene, and $n$ is an integer above 1 and below 4, the temperature and time of the milling at 120° to 250° C. and the proportion of promotor being such as to substantially improve the properties of the said copolymer.

References Cited by the Examiner
UNITED STATES PATENTS

| | | | |
|---|---|---|---|
| 2,798,860 | 7/1957 | Hand et al. | 260—781 |
| 2,822,342 | 2/1958 | Ford et al. | 260—85.3 |
| 2,922,780 | 1/1960 | D'Amico et al. | 260—79.5 |

JOSEPH L. SCHOFER, *Primary Examiner.*

E. J. SMITH, *Assistant Examiner.*